United States Patent [19]

Inamori

[11] Patent Number: 5,796,444
[45] Date of Patent: Aug. 18, 1998

[54] SYNCHRONIZATION DETECTION CIRCUIT

[75] Inventor: Shinri Inamori, Yokohama, Japan

[73] Assignee: Texas Instruments Incorporated, Dallas, Tex.

[21] Appl. No.: 536,887

[22] Filed: Sep. 29, 1995

[51] Int. Cl.$^6$ .................................................. H04N 5/08
[52] U.S. Cl. ........................... 348/525; 348/521; 348/500
[58] Field of Search ................................. 348/525, 521, 348/500, 526, 530, 536, 540; 375/362, 365, 368, 371; 370/509, 511, 513, 516; H04N 5/04, 5/08, 5/12

[56] References Cited

U.S. PATENT DOCUMENTS

| | | | |
|---|---|---|---|
| 5,148,276 | 9/1992 | Furumiya et al. | 358/153 |
| 5,220,411 | 6/1993 | Kitaura et al. | 358/19 |

FOREIGN PATENT DOCUMENTS

| | | | |
|---|---|---|---|
| 08204991 A | 8/1996 | Japan | H04N 5/08 |
| 08223445 A | 8/1996 | Japan | H04N 5/08 |
| 08223446 A | 8/1996 | Japan | H04N 5/08 |
| 08242392 A | 9/1996 | Japan | H04N 5/08 |
| 08275026 A | 10/1996 | Japan | H04N 5/08 |

*Primary Examiner*—John K. Peng
*Assistant Examiner*—Jean W. Désir
*Attorney, Agent, or Firm*—William B. Kempler; Richard L. Donaldson; Jay M. Cantor

[57] ABSTRACT

A synchronization detection circuit quickly detects resynchronization to a new input signal quickly when the input signal changes, etc. A frame synchronization detection circuit 3 synchronizes the frame pattern contained in, for example, the MUSE signal, etc., and a frame synchronizing signal (signal (IFP1)) formed in the MUSE decoder, pattern detection circuits 30, an integrating circuit 32, and a slicing circuit 36 function in concert to detect and output the frame pattern to a phase comparator 36 as a signal (SS). Phase comparator 36 and judging circuit 38 function in concert to detect nonsynchronization when the fact that the phase difference between signal (IFP1) formed by frequency dividing circuit 42 and signal (SS) exceeds the prescribed value is detected continuously for 8 frames or when the fact that the phase difference between signal (SS) and signal (IFP1) exceeds the prescribed value and the phase difference between signal (SS) and signal (IFP2) does not exceed the prescribed value is detected continuously for 2 frames, and gate circuit 40 initializes frequency dividing circuit 42 when nonsynchronization is detected and matches the phase of signal (IFP1) to the phase of signal (SS).

2 Claims, 5 Drawing Sheets

FIG. 2    G:GUARD REGION

SYNCHRONIZATION DETECTION CIRCUIT

FIELD OF THE INVENTION

The present invention relates to a synchronization detection circuit for detecting the frame synchronization of video signals, such as the video signals in high definition television (HDTV) systems using bandwidth-compressed video signals.

BACKGROUND OF THE INVENTION

Presently, HDTV systems are being commercialized for use with satellite broadcasts, etc. Typically HDTV video signals are bandwidth-compressed before they are broadcast and then after reception bandwidth-expanded at the receiver end. For example, in Japan NHK has developed a bandwidth-compressed HDTV broadcasting system employing Multiple Sub-Nyquist Sampling Encoding (MUSE), as described by Y. Ninomiya et al. in "An HDTV Broadcasting System Utilizing a Bandwidth Compression Technique -MUSE", IEEE Transactions on Broadcasting, Vol. BC-33, No. 4, Dec. 1987, pp. 130–160, herein incorporated by reference.

A MUSE decoder receives transmitted video signals (MUSE signals) which were bandwidth-compressed before broadcast by the MUSE system and expands their bandwidth. In a MUSE decoder, the bandwidth-expanding circuit, etc. must be synchronized with the frames of the transmitted MUSE signals.

In order to synchronize the MUSE decoder with the frames of the MUSE signals (for expanding the bandwidth circuit, etc.), it is necessary to establish frame synchronization of the MUSE signals and the frame synchronizing signals within the MUSE decoder and detect the nonsynchronization. A frame synchronization detection circuit used for the aforementioned application is disclosed in, for example, "Clock Synchronization Circuit for MUSE Receiver (Manta, Transactions of the 1985 of Television Society 13–16, pages 377–378)" (Reference 1).

The frame synchronization detection circuit disclosed in Reference 1 detects the establishment of frame synchronization when the synchronizing signal formed by the MUSE decoder and the frame pulse contained in the MUSE signal is less than a fixed value, for example, ±1 clock [sic] continuously for more than 8 frames of the MUSE signal. Also, the frame synchronization detection circuit disclosed in Reference 1 detects nonsynchronization in the frame synchronization when the phase difference of the synchronizing signal and the frame pulse is greater than a fixed value continuously for more than 8 frames after detecting the establishment of synchronization.

However, in the MUSE decoder which uses the conventional frame synchronization detection circuit disclosed in Reference 1, there was the problem of not synchronizing to the MUSE signals newly input in all cases until frame nonsynchronization is detected once.

For example, when establishment of frame synchronization is detected using the conventional frame synchronization detection circuit and expanding the bandwidth of the MUSE signals, a period of at least 8 frames of the MUSE signal is necessary until detecting nonsynchronization from the original MUSE signal even when input video signal (MUSE signal) switching is generated by channel switching of the broadcast received. Consequently, there was the problem of not being able to expand the bandwidth of the MUSE signals for at least 8 frames after the MUSE signal is switched and of disorder being formed in the picture obtained during this time.

In order to detect the establishment of frame synchronization quickly, it is only necessary to reduce the frame count until the detection of resynchronization or the detection of nonsynchronization occurs. However, when the frame count is minimized, there is the problem of detection of nonsynchronization being generated frequently when random noise is superimposed on the received MUSE signals, etc.

The present invention was conceived in light of the problems of the conventional technology and aims to provide a synchronization detection circuit which can detect resynchronization to the new input signals quickly when channel switching, etc., is generated and there is a change in the input signals.

Also, the present invention aims to provide a synchronization detection circuit which does not unnecessarily detect nonsynchronization frequently even when random noise, etc., is superimposed on the input signals despite the ability to detect resynchronization quickly.

SUMMARY OF THE INVENTION

In order to achieve the objective, the synchronization detection circuit of the present invention has a synchronization pattern formation means which forms synchronization pattern by detecting the signal pattern contained in the input signal at a prescribed cycle, a first synchronizing signal formation means which forms the first synchronizing signal of the cycle as the synchronization pattern, a second synchronizing signal formation means which forms a second synchronizing signal of same cycle as the synchronization pattern by being initialized by the synchronization pattern, a first phase difference detecting means which detects the first phase difference of the synchronization pattern and the first synchronizing signal, a second phase difference detecting means which detects the second phase difference of the synchronization pattern and the second synchronizing signal, a nonsynchronization judging means which detects the state in which the first phase difference becomes greater than the processing value continuously for more than the first numerical value or a state in addition to the first phase difference becoming greater than the prescribed value, the cycle at which the second phase difference-becomes less than the prescribed value continuously by more than the second numerical value which is less than the first numerical value as a measure of nonsynchronization, and an initializing means which initializes the first synchronizing signal formation means according to the synchronization pattern when the nonsynchronization judging means detects nonsynchronization and matches the phase of the synchronizing signal to the phase of the synchronization pattern.

The synchronization pattern formation means detects the frame pulse of, for example, the MUSE system video signals (MUSE signals).

The first and second synchronizing signal formation means respectively forms first and second synchronizing signals (frame synchronizing signals (IFP1, IFP2) of frame synchronization detection circuit (3) in the second embodiment) synchronized to the frame pulse of, for example, the MUSE system video signals (MUSE signals).

The first and second phase difference detecting means respectively detects the frame pulse from the MUSE signals and detects whether the phase difference of the first and second synchronizing signals formed respectively by the first and second synchronizing signal formation means and the frame pulse of the MUSE signal are less than a prescribed value, for example, less than ±1 clock |pulses| of the clock signal reproduced by the MUSE decoder.

The nonsynchronization judging means determines that the frame pulse and the synchronizing signal are not synchronized when the frame cycle in which the phase difference between the detected frame pulse and the first synchronizing signal is greater than a prescribed value continues for more than a first value, for example, 8, or when the frame cycle in which the phase difference of the frame pulse and the first synchronizing signal is greater than a prescribed value in addition to the phase difference between the detected frame pulse and the second synchronizing signal being less than a prescribed value continuing for more than a second value, for example, 2. The initializing means synchronizes the first synchronizing signal to the frame pulse by initializing the first synchronizing signal formation means based on the nonsynchronization evaluation.

1 ... decoder, 3, 9 ... frame synchronization detection circuits, 902, 30.. .pattern detection circuits, 904, 32 ... integrating circuits, 906, 34 ... slicing circuits, 908, 36 ... phase comparators, 910, 38 ... judging circuits, 912, 40 ... gate circuits, 14, 42, 44 ... frequency dividing circuits, 920, 380, 386, 480, 486.. counter circuits, 484, 490 ... comparators, 922, 382, 384, 390, 388, 482, 488, 492 ... logic circuits.

DESCRIPTION OF THE EMBODIMENTS

Embodiment 1

Below, the first embodiment of the present invention will be explained with reference to FIGS. 1–7.

First, the constitution of MUSE decoder 1 used in frame synchronization detection circuit 9 of the present invention and the frame pulse of MUSE signal will be explained with reference to FIGS. 1–3 as a basis of the operating principles of frame synchronization detection circuit 9 of the present invention, to be discussed later with reference to FIGS. 4–7.

Figure 1:
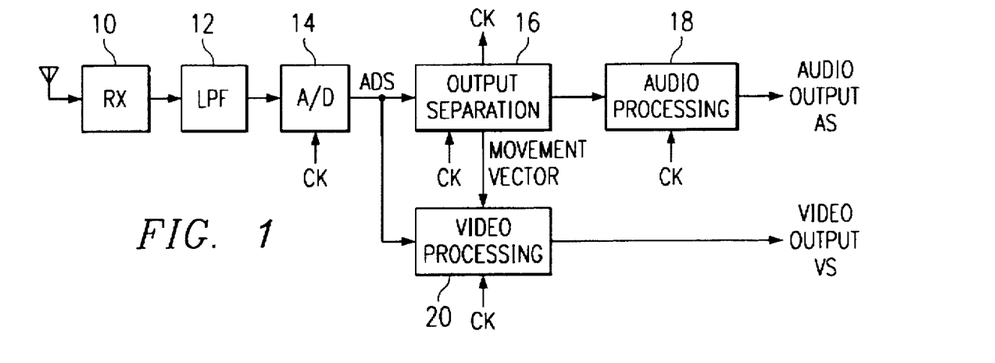
FIG. 1 shows the constitution of a MUSE decoder used by the frame synchronization detection circuit of the present invention.

FIG. 1 shows the constitution of MUSE decoder 1 used in frame synchronization detection circuit 9 of the present invention.

MUSE decoder 1 is a device which receives |composite| video signals (hereafter noted simply as "MUSE signals") transmitted from broadcast satellite (BS), etc., as broadcast waves which are HDTV (HDTV) video signals which have been bandwidth-compressed by the MUSE system, and which outputs video output (VS) and audio output (AS) by bandwidth expansion of the video signals and demodulation of the audio signals.

As shown in FIG. 1, MUSE decoder 1 comprises receiving circuit (RX) 10, low-pass filter (LPF) 12, analog/digital converter (A/D converter) 14, signal separating circuit 16, audio processing circuit 18, and video processing circuit 20.

Receiving circuit 10 receives the broadcast waves and outputs them to low-pass filter 12 for extraction of the MUSE signals.

Low-pass filter 12 only passes signal components below 8.1 MHz from the MUSE signals input from receiving circuit 10 and outputs them to A/D converter 14.

A/D converter 14 samples MUSE signals input from low-pass filter 12 at 16.2 MHz- converts the MUSE signals into 8-bit format, and outputs digital MUSE signals (ADS) to signal separating circuit 16 and video processing circuit 20.

Signal separating circuit 16 reproduces clock signal (CK), etc., of 16.2 MHz from digital MUSE signal (ADS) input from A/D converter 14, supplies it to each circuit of MUSE decoder 1, detects the frame pulse (to be discussed below with reference to FIG. 2 and FIG. 3), frame synchronizes MUSE decoder 1 and digital MUSE signal (ADS), extracts movement vector and audio signal from digital MUSE signal (ADS), and outputs respectively to video processing circuit 20 and audio processing circuit 18.

Audio processing circuit 18 processes the audio signals input from signal separating circuit 16 and outputs audio output (AS).

Video processing circuit 20 has still-image formation device and moving images formation device, forms still-images and moving pictures by expanding of the bandwidth the MUSE signals from the movement vector input from signal separating circuit 16 and digital MUSE signal (ADS), and outputs one of the two as video output (VS).

Frame synchronization detection circuit 9 of the present invention forms frame synchronizing signal (IFP) in signal separating circuit 16 and is also used to establish synchronization of the frame pulse of digital MUSE signal (ADS) and frame synchronizing signal (IFP) and to detect nonsynchronization.

Below the position in the frame constitution of the frame pulse of MUSE signal and the detection method will be explained with reference to FIG. 2 and FIG. 3.

Figure 2:
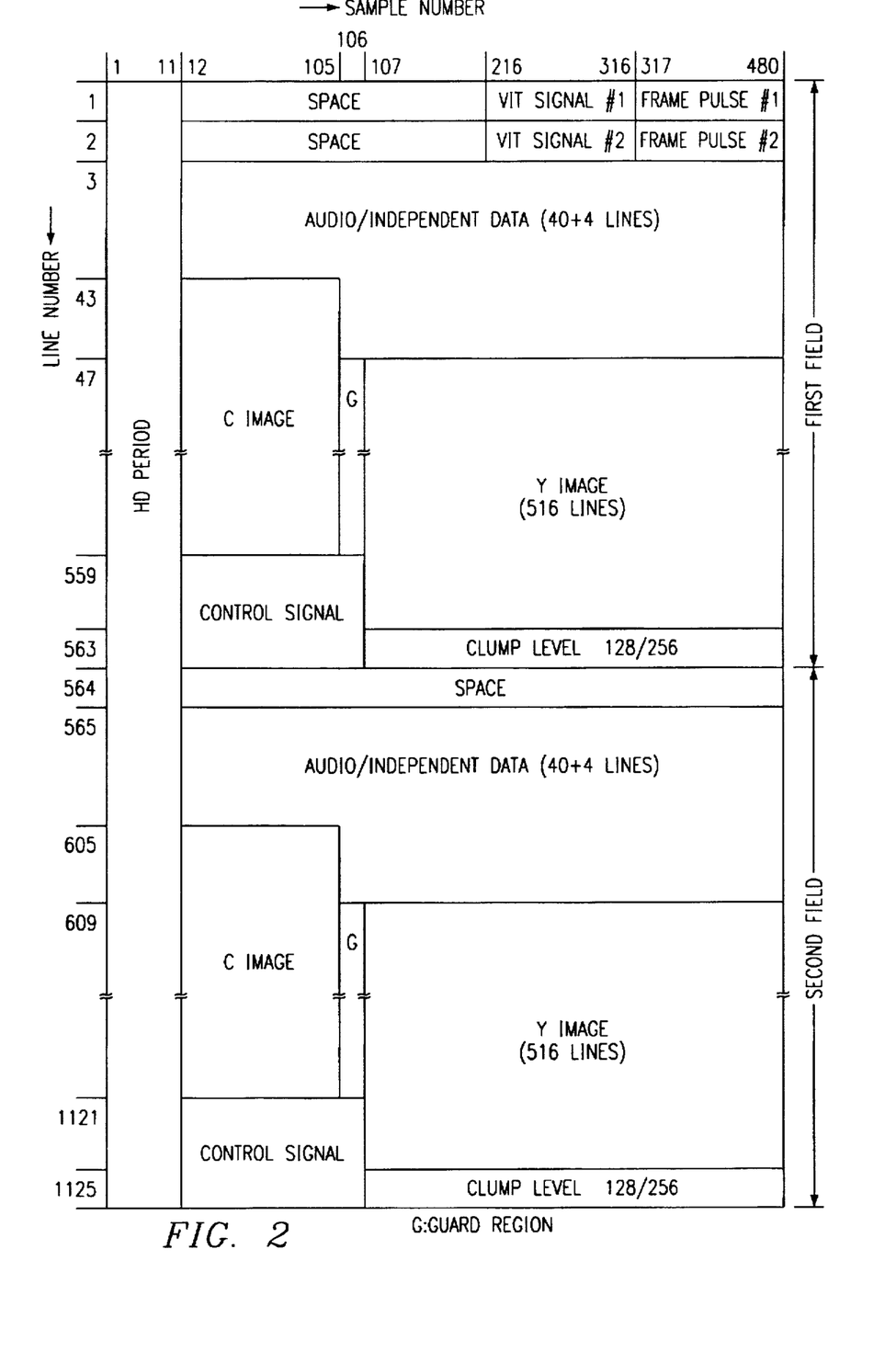
FIG. 2 shows the frame constitution of MUSE signal.

FIG. 2 shows the frame constitution of a MUSE signal.

Figure 3:
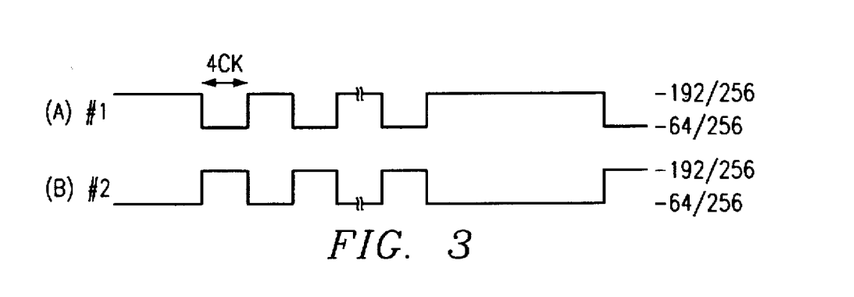
FIG. 3 shows the frame pulse waveform of MUSE signal. (A) shows the waveform of frame pulse #1 shown in FIG. 2, and (B) shows the waveform of frame pulse #2 shown in FIG. 2.

FIG. 3 shows the frame pulse waveform of MUSE signal. (A) shows the waveform of frame pulse #1 shown in FIG. 2, and (B) shows the waveform of frame pulse #2 shown in FIG. 2. The frame constitution of MUSE signal is the constitution shown in FIG. 2 as disclosed in, for example, "MUSE High Vision Transmission System (Yuichi Ninomiya, Dec. 1, 1990, Journal of Electronic Information Communication Society, page 45)" (Reference 2).

The frame pulse of digital MUSE signal (ADS) is input to signal separating circuit 16 of MUSE decoder 1 as frame pulse #1 in sample number 317 to sample number 480 of line number 1 in FIG. 2 and frame pulse #2 in sample number 317 to sample number 480 of line number 2.

Frame pulses #1 and #2 shown in FIG. 2 are signal patterns in which the high level of the waveform is $192/256 (= 3/4)$ and the low level of the waveform is $64/256 (=1/4)$ when it is a digital MUSE signal (ADS), and the waveform levels at the position corresponding to line number 1 and line number 2 are reversed as shown in FIG. 3(A) and (B).

When digital MUSE signal (ADS) is discriminated as logic value 1 when it is over the threshold value and as logic value 0 when it is less than the threshold value, with, for example, $128/256 (=3/4)$ as the threshold value, the exclusive-OR of this logic value and that of the discrimination result of the previous line yields the part corresponding to the frame pulse, i.e., where the logic value is 1, during 164 samples (164 cycles clock signal (CK) of 16.2 MHz).

Thus, by discriminating digital MUSE signal (ADS) in two values and detecting the part where the result of the exclusive-OR operation of the logic value of the discrimination result and the logic value of the discrimination result of the previous line is a logic value of 1 in, for example, just 164 samples, it is possible to easily detect the frame pulse of the MUSE signal and frame synchronizing signal (IFP) can be formed and synchronized to the detected frame pulse.

Below, the constitution of frame synchronization detection circuit 9 of the present invention will be explained with reference to FIG. 4 and FIG. 5.

Figure 4:
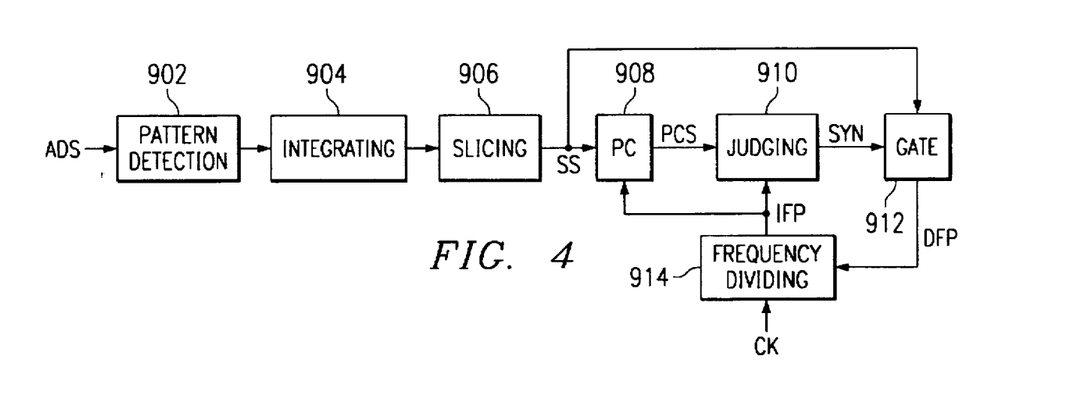
FIG. 4 shows the constitution of frame synchronization detection circuit of the present invention of the first embodiment.

As shown in FIG. 4, frame synchronization detection circuit 9 comprises pattern detection circuit 902, integrating circuit 904, slicing circuit 906, phase comparator (PC) 908, judging circuit 910, gate circuit 912, and frequency dividing circuit 914.

Figure 5:
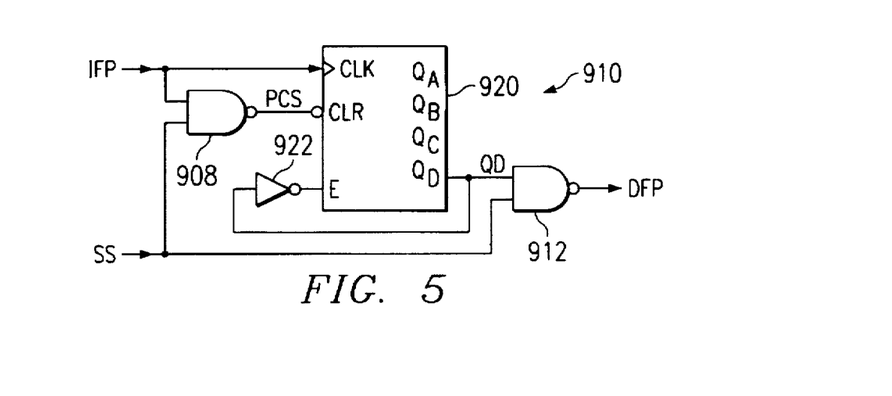
FIG. 5 shows the constitution of the phase comparator, judging circuit, and gate circuit of the frame synchronization detection circuit shown in FIG. 4.

Also, phase comparator 908 comprises a logic circuit which computes the inverted logical product of frame pulse (SS) input from slicing circuit 906 and frame synchronizing signal (IFP) input from frequency dividing circuit 914 as shown in FIG. 5.

Judging circuit 910 comprises counter circuit 920 and logic circuit 922.

Counter circuit 920 counts the first transition point of frame synchronizing signal (IFP) input to input terminal (CLK) in digital form when the signal input to input terminal (E) from logic circuit 922 has logic value 1 and signal (PCS) input to input terminal (CLR) from phase comparator 908 has logic value 1, outputs count values (QA)–(QD), and initializes the count value when output signal (PCS) input to input terminal (CLR) from phase comparator 908 has logic value 0 ((clears) the count value to 0).

Logic circuit 922 inverts the logic value of count value (QD) in counter circuit 920 and outputs to input terminal (E) of counter circuit 920.

Count values (QA), (QB), (QC), and (QD) correspond respectively to numerical values 1, 2, 4, and 8.

Gate circuit 912 calculates the inverted logical product of count value (QD) of counter circuit 920 and the frame pulse (SS) input from slicing circuit 906.

Below, the operation of frame synchronization detection circuit 9 will be explained with reference to FIG. 6 and FIG. 7.

Figure 6:
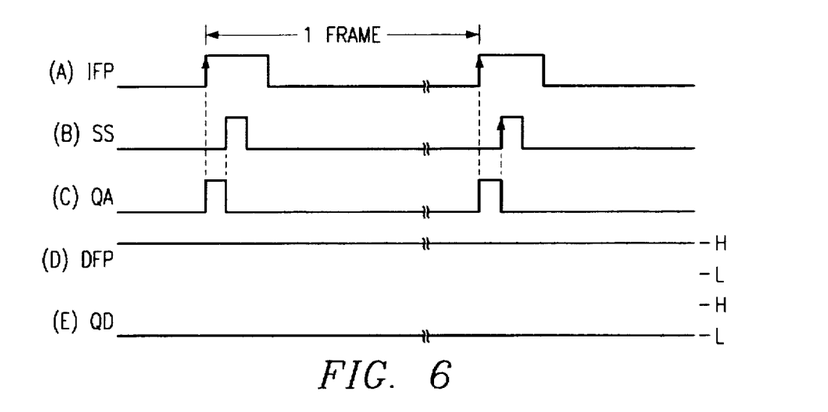
FIG. 6 is a timing diagram showing the operation of frame synchronization detection circuit when the establishment of synchronization between the frame pulse and frame synchronizing signal (IFP) is detected. (A) shows the waveform of frame synchronizing signal (IFP), (B) the waveform of frame pulse (SS), (C) the value of count value (QA) of counter circuit, (D) the waveform of output signal (DFP), and (E) the waveform of signal (QD).

FIG. 6 is a timing diagram showing the operation of frame synchronization detection circuit 9 when establishment of synchronization between the frame pulse and frame synchronizing signal (IFP) is detected. (A) shows the waveform of frame synchronizing signal (IFP), (B) the waveform of frame pulse (SS), (C) the count value (QA) of counter circuit 920, (D) the waveform of output signal (DFP), and (E) the waveform of signal (QD).

Figure 7:
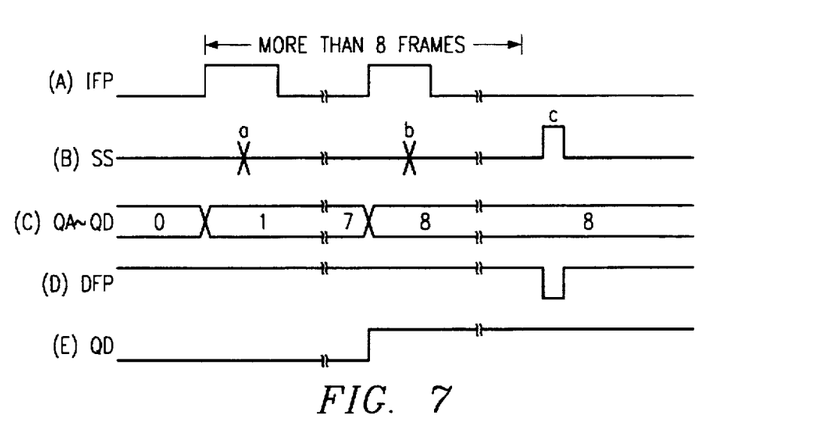
FIG. 7 is a timing diagram showing the operation of frame synchronization detection circuit when nonsynchronization between the frame pulse and frame synchronizing signal (IFP) is detected. (A) shows the waveform of frame synchronizing signal (IFP), (B) the waveform of frame pulse (SS), (C) the values of count values (QA)–(QD) of the counter circuit, (D) the waveform of output signal (DFP), and (E) the waveform of signal (QD).

FIG. 7 is a timing diagram showing the operation of frame synchronization detection circuit 9 when nonsychronization of the frame pulse and frame synchronizing signal (IFP) is detected. (A) shows the waveform of frame synchronizing signal (IFP), (B) shows the waveform of frame pulse (SS), (C) shows the values of count values (QA)–(QD) of counter circuit 920, (D) shows the waveform of output signal (DFP), and (E) shows the waveform of signal (QD).

The signals in FIG. 6 and FIG. 7 correspond to the locations in FIG. 4 and FIG. 5 with the same names.

Frame synchronization detection circuit 9 detects the establishment of frame synchronization, for example, when the frame pulse contained in digital MUSE signal (ADS) and frame synchronizing signal (FP) used in each circuit if MUSE decoder 1 is below a fixed value, for example, ±1 sample (±1 clock in clock signal (CK)) continuously for more than 8 frames of the MUSE signal. Frame synchronization detection circuit 9 detects nonsynchronization of the frame synchronization when the phase difference of the frame pulse and the synchronizing signal is than a fixed value continuously for more than 8 frames after detecting synchronization.

MUSE signal is input into pattern detection circuit 902 of frame synchronization detection circuit 9 as digital MUSE signal (ADS) by being converted into digital signal in A/D converter 14 from receiving circuit 10 of MUSE decoder 1 shown in FIG. 1.

Pattern detection circuit 902 discriminates digital MUSE signal (ADS) in binary values as noted above, calculates the exclusive-OR of the discrimination result and the discrimination value of the previous line, and outputs to integrating circuit 904.

Integrating circuit 904 is a counter which, for example, counts up clock signal (CK) (increments the count value by 1 for each first transition of time clock signal (CK)), and when the signal input from pattern detection circuit 92 is logic value 0, it has been cleared, and when the signal input from pattern detection circuit 902 is logic value 1, clock signal (CK) is counted and the count value is output to slicing circuit 906.

Slicing circuit 906 compares the count value input from integrating circuit 904 and numerical value 164 (A4h, h indicates hexadecimal), detects the frame pulse shown in FIG. 2 when the count value becomes 164, forms frame pulse (SS) which becomes logic value 1 for one sample (1 cycle of clock signal (CK)) with a time period from when the frame pulse shown in FIG. 6(B) and FIG. 7(B) was detected, and outputs to gate circuit 912 and phase comparator 908.

Frequency dividing circuit 914 is initialized when output signal (DFP) input from gate circuit 912 has logic value 0, frequency divides clock signal (CK) into 1/480×1125 when output signal (DFP) has logic value 1, forms frame synchronizing signal (IFP), which becomes, for example, logic value 1 for three samples (3 cycles of clocks signal (CK)) shown in FIG. 6(A) and FIG. 7(A), and outputs to phase comparator 908 and judging circuit 910.

Frame synchronizing signal (IFP) formed in frequency dividing circuit 914 is used as frame synchronizing signal in each circuit of MUSE decoder 1 shown in FIG. 1.

Below, the operation of phase comparator 908, judging circuit 910, and gate circuit 912 of frame synchronization detection circuit 9 when establishment of synchronization between frame pulse (SS) and frame synchronizing signal (IFP) is detected will be explained with reference to FIG. 5 and FIG. 6.

Frame pulse (SS) formed as noted above is input to gate circuit 912 and phase comparator 908, and frame synchronizing signal (IFP) is input to phase comparator 908 and judging circuit 910.

As shown in FIGS. 6(A) and (B), when frame pulse (SS) is logic value 1 within the time when frame synchronizing signal (IFP) is logic value 1, namely, when the phase difference of frame pulse (SS) and frame synchronizing signal (IFP) is less than ±1 sample (±1 cycle of clock signal (CK)), output signal (PCS) of phase comparator 908 becomes logic value 0. Therefore, as long as frame pulse (SS) and frame synchronizing signal (IFP) can be synchronized, counter circuit 920 is cleared for each cycle of frame synchronizing signal (IFP).

In the count values of counter circuit 920, count value (QA) becomes logic value 1 from the first transition of frame synchronizing signal (IFP) until the first transition of frame pulse (SS) as shown in FIG. 6(C), count value (QD) becomes logic value 0 as shown in FIG. 6(D), and output signal (DFP) output from gate circuit 912 shown in FIG. 6(E) becomes logic value 1.

Below, the operation of phase comparator 908, judging circuit 910, and gate circuit 912 of frame synchronization detection circuit 9 will be explained by referring to FIG. 5 and FIG. 7 for the case where frame pulse (SS) and frame synchronizing signal (IFP) do not synchronize. As shown at time (a) and (b) in FIG. 7(B), when frame pulse (SS) is not logic value 1 within the time when frame synchronizing signal (IFP) is logic value 1, namely, when the phase difference between frame pulse (SS) and frame synchronizing signal (IFP) is greater than ±1 sample, output signal (PCS) of phase comparator 908 always has a logic value of 1. Therefore, count values (QA)–(QD) of counter circuit 920 are incremented every time first transition point of frame synchronizing signal (IFP) is input as shown in FIG. 7(C).

When count values (QA)–(QD) of counter circuit 920 has numerical value 8, namely, only count value (QD) is logic value 1 and the others are logic value 0, the logic value of count value (QD) is inverted by logic circuit 922, and logic value 0 is output to input terminal (E) of counter circuit 920. When logic value 0 is input into input terminal (E) of counter circuit 920, counter circuit 920 stops counting until the phase difference between frame synchronizing signal (IFP) and frame pulse (SS) is again less than ±1 sample and output signal (PCS) of phase comparator 908 is logic value 0 while holding the count value.

When frame pulse (SS) becomes logic value 1 at time c shown in FIG. 7(B), output signal (DFP) output from gate circuit 912 goes to logic value 0, frequency dividing circuit 914 is initialized, and frame synchronizing signal (IFP) synchronized to frame pulse (SS) is formed.

A count value (QD) of numerical 0 indicates that the synchronization of frame synchronizing signal (IFP) and the frame pulse of digital MUSE signal (ADS) is established, and logic value 1 indicates nonsynchronization. Count value (QD) is used in addition to frame synchronizing signal (IFP) as synchronization detection signal in each circuit of MUSE decoder 1.

Embodiment 2

Below, the second embodiment of the present invention will be explained with reference to FIG. 8–11.

Frame synchronization detection circuit 9 of the first embodiment executes the same operation as the frame synchronization detection circuit of the prior art, so that there is the problem of not detecting the synchronization of frame synchronizing signal (IFP) and frame pulse (SS) of new MUSE signal in all cases, even when the input MUSE signal is switched until frame synchronization detection circuit 9 detects frame nonsynchronization.

Frame synchronization detection circuit 3 of the present invention explained below is a circuit which improves frame synchronization detection circuit 9 of the first embodiment and solves the problem, and replaces frame synchronization detection circuit 9 of MUSE decoder 1 shown in FIG. 1.

Frame synchronization detection circuit 3 is configured to synchronize frame synchronizing signal (IFP1) to frame pulse (SS) by detecting nonsynchronization when the fact that the phase difference between frame pulse (SS) and frame synchronizing signal (IFP1) is greater than a prescribed value is detected continuously for 8 frames and by detecting the establishment of synchronization when the fact that the phase difference between frame pulse signal (SS) and frame synchronizing signal (IFP2) is less than a prescribed value is detected continuously for 2 frames.

First, the constitution of frame synchronization detection circuit 3 will be explained with reference to FIG. 8 and FIG. 9.

Figure 8:
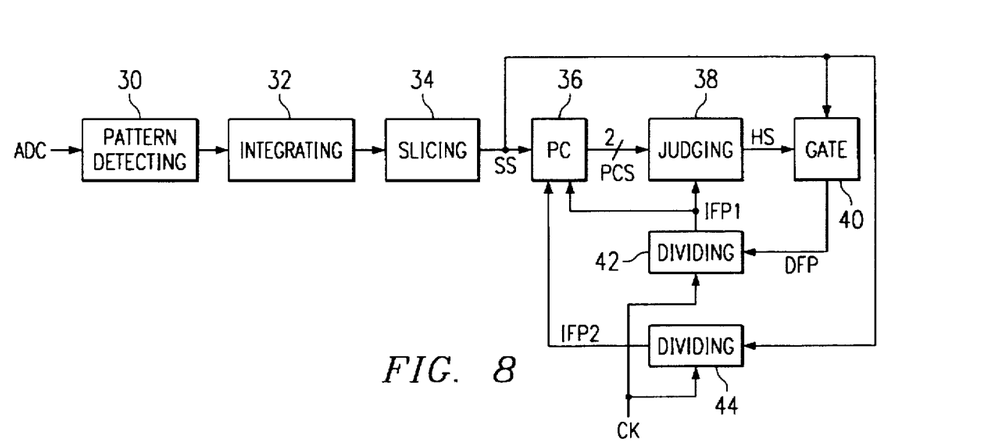
FIG. 8 shows the constitution of frame synchronization detection circuit of the present invention of the second embodiment.

FIG. 8 is a figure showing the constitution of frame synchronization detection circuit 3 of the present invention in the second embodiment.

Figure 9:
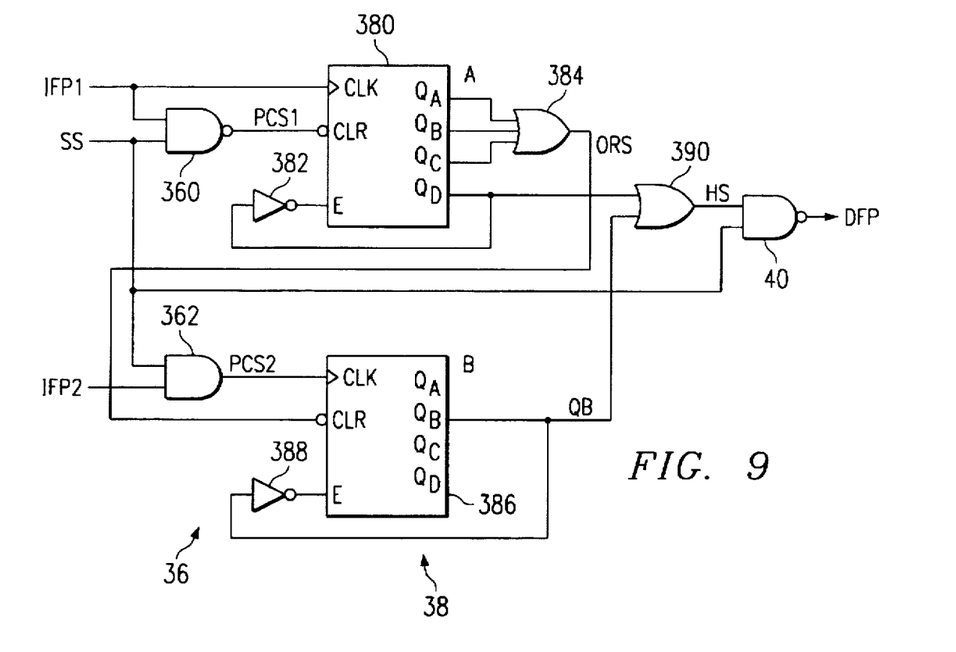
FIG. 9 shows the constitution of the phase comparator, judging circuit, and gate circuit shown in FIG. 8.

FIG. 9 is a figure showing the constitution of phase comparator 36, judging circuit 38, and gate circuit 40 shown in FIG. 8.

As shown in FIG. 8, frame synchronization detection circuit 3 comprises pattern detection circuit 30, integrating circuit 32, slicing circuit 34, phase comparator (PC) 36, judging circuit 38, gate circuit 40, first frequency dividing circuit 42 and second frequency dividing circuit 44.

The constitution of phase comparator 36, judging circuit 38, and gate circuit 40 will be discussed below with reference to FIG. 9. Pattern detection circuit 30, integrating circuit 32, and slicing circuit 34 within each part of frame synchronization detection circuit 3 have respectively the same functions as pattern detection circuit 902, integrating circuit 904, and slicing circuit 906 of frame synchronization detection circuit 9 shown in the first embodiment and perform the same operations so that their explanations will be omitted for the second embodiment.

Below, the constitution of phase comparator 36, judging circuit 38, and gate circuit 40 will be explained with reference to FIG. 9.

Phase comparator 36 comprises logic circuit 360 which calculates the inverted logical product of frame pulse (SS) input from slicing circuit 34 and frame synchronizing signal (IFP1) which was input, and logic circuit 362 which calculates the logical product of frame pulse (SS) and frame synchronizing signal (IFP2) which was input.

Output signal (PCS1) of logic circuit 360 in phase comparator 36 is output to input terminal (CLR) of counter circuit 380, and signal (PCS2) of logic circuit 362 is output to input terminal (CLK) of counter circuit 386.

Judging circuit 38 comprises counter circuits 380 and 386 which have the same function as counter circuit 920 of frame synchronization detection circuit 9 shown in the first embodiment, logic circuit 382 which inverts the logic value of count value (QD) of counter circuit 380 and sends its output to input terminal (E) of counter circuit 380, logic circuit 384 which calculates the logical sum of count values (QA)-(QC) of counter circuit 380 and send its output to input terminal (CLR) of counter circuit 386, logic circuit 388 which inverts the logic value of count value (QB) in counter circuit 386 and send its output to input terminal (E) of counter circuit 386, and logic circuit 390 which calculates the logical sum of count value (QB) of counter circuit 386 and count value (QD) of counter circuit 380 and sends its outputs to gate circuit 40 as output signal (HS).

Gate circuit 40 calculates the inverted logical product of count value (QB) of counter circuit 386 and output signal (HS) input from logic circuit 390, and then sends its output to frequency dividing circuit 42) as output signal (DFP).

With respect to the constitutional elements of frame synchronization detection circuit 3 discussed above, pattern detection circuit 30, integrating circuit 32, and slicing circuit 34 correspond to the synchronization pattern formation means of the present invention. Frequency dividing circuits 42 and 44 correspond respectively to the first and second synchronizing signal formation means related to the present invention. Logic circuits 360 and 362 of phase comparator 36 correspond respectively to first and second phase difference detecting means. Logic circuits 382, 384, 388, and 390, and counter circuits 380 and 386, and logic circuits 382 and 386 of judging circuit 38 correspond to the nonsynchronization judging circuit of the present invention. Logic circuits 388 and 390 and gate circuit 40 correspond to the synchronization judging means of the present invention. Gate circuit 40 corresponds to the initialization means of the present invention.

Below the operation of frame synchronization detection circuit 3 will be explained with reference to FIG. 10 and FIG. 11.

Figure 10:
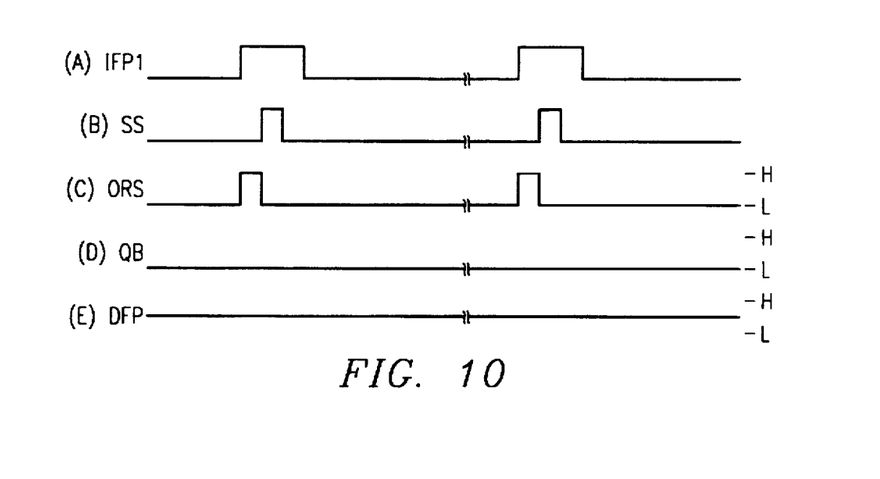
FIG. 10 is a timing diagram showing the operation of frame synchronization detection circuit when the establishment of synchronization between the frame pulse and frame synchronizing signal (IFP1) is detected. (A) shows the waveform of frame synchronizing signal (IFP1), (B) the waveform of frame pulse (SS), (C) the waveform of output signal (ORS) of the logic circuit, (D) the logic value of count value (QB) of counter circuit, and (E) the waveform of output signal (DFP).

FIG. 10 is a timing diagram showing the operation of frame synchronization detection circuit 3 when establishment of synchronization between the frame pulse and frame synchronizing signal (IFP1) is detected. (A) shows the waveform of frame synchronizing signal (IFP1), (B) the waveform of frame pulse (SS), (C) the waveform of output signal (ORS) of logic circuit 384, (D) the logic value of count value (QB) in counter circuit 386, and (E) shows the waveform of output signal (DFP).

Figure 11:
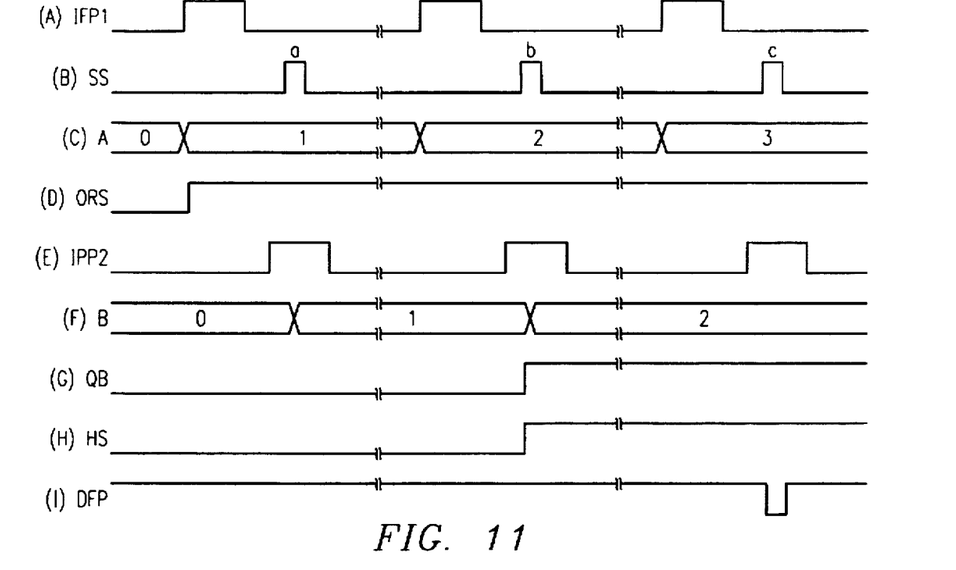
FIG. 11 is a timing diagram showing the operation of frame synchronization detection circuit when nonsynchronization between frame pulse and frame synchronizing signal (IFP1) is detected. (A) shows the waveform of frame synchronizing signal (IFP1), (B) the waveform of frame pulse (SS), (C) value A of count values (QA)–(QD) of counter circuit, (D) the waveform of output signal (ORS), (E) the waveform of frame synchronizing signal (IFP2), (E) shows value B of count values (QA)–(QD) of counter circuit (380), (D) shoes the logic value of count value (QB) of counter circuit (386), (H) shows the waveform of output signal (HS), and (I) shows the waveform of output signal (DFP).

FIG. 11 is a flow chart showing the operation of frame synchronization detection circuit 3 when nonsynchronization of frame pulse and frame synchronizing signal (IFP1) is detected. (A) shows the waveform of frame synchronizing signal (IFP1), (B) the waveform of frame pulse (SS), (C) value (A) of count values (QA)-(QD) of counter circuit 380, (D) the waveform of output signal (ORS), (E) shows the waveform of frame synchronizing signal (IFP2), (E) value (B) of count values (QA)-(QD) of counter circuit 386, (D) shows the logic value of count value (QB) of counter circuit 386, (H) shows the waveform of output signal (HS) output from logic circuit 390, And (I) shows the waveform of output signal (DFP).

The signals in FIG. 10 and FIG. 11, correspond to the locations shown in FIG. 8 and FIG. 9 with the same names.

Pattern detection circuit 30, integrating circuit 32, and slicing circuit 34 of frame synchronization detection circuit 3 execute the same operations as pattern detection circuit 902, integrating circuit 904, and slicing circuit 906 of frame synchronization detection circuit 9 shown in the first embodiment, form frame pulse (SS), which is output to phase comparator 36, gate circuit 40, and frequency dividing circuit 44.

Frequency dividing circuit 42 is initialized when output signal (DFP) input from gate circuit 40 has logic value 0, frequency divides clock signal (CK) into 1/480×1125 when output signal (DFP) has logic value 1, forms frame synchronizing signal (IFP1) which goes to logic value 1 for three samples (3 cycles of clock signal (CK)), as shown, for example, in FIG. 10(A) and Figure 11(A), and outputs to phase comparator 36) and judging circuit 38. Frame synchronizing signal (IFP1) formed in frequency dividing circuit 42 is used as frame synchronizing signal in each circuit of MUSE decoder 1 in the same manner as frame synchronizing signal IFP) formed by frequency dividing circuit 914 of frame synchronization detection circuit 9 shown in the first embodiment.

Frequency dividing circuit 44 is initialized when frame pulse (SS) input from slicing circuit 34 has logic value 1, frequency divides clock signal (CK) into 1/480 1125 when frame pulse (SS) has logic value 0, forms frame synchronizing signal (IFP2) which goes to logic value 1 for three samples (3 cycles of clock signal, (CK)), as shown, for example, in FIG. 11 (E), and outputs to phase comparator 36.

The operation of phase comparator 36, judging circuit 38 and gate circuit 40 of frame synchronization detection circuit 3 will be explained below with reference to FIG. 9 and 10 for the case when synchronization between frame pulse (SS) and frame synchronizing signal (IFP) is established.

Frame pulse (SS) formed as noted above is input into phase comparator 36, gate circuit 40, and frequency dividing circuit 44. Frame synchronizing signal (IFP1) is input into phase comparator 36 and judging circuit 38, and frame synchronizing signal (IFP2) into phase comparator 36.

As shown in FIGS. 6(A) and (B), when frame pulse (SS) has logic value 1 within the time frame synchronizing signal (IFP) is logic value 1, namely, when the phase difference between frame pulse (SS) and frame synchronizing signal (IFP1) is less than ±1 sample, output signal (PCS1) of logic circuit 360 in phase comparator 36 goes to logic value 0. Therefore, as long as frame pulse (SS) and frame synchronizing signal (IFP1) are synchronized, counter circuit 360 is cleared for each cycle of frame synchronizing signal (IFP1). Consequently, count value (QD) of logic circuit 360 is always at logic value 0.

The output signal of logic circuit 384 is at logic value 1 only from the time of first transition point of frame synchronizing signal (IFP) until the time of first transition point of frame pulse (SS), as shown in FIG. 6(C), and count value (QD) of counter circuit 386 is always at logic value 0, as shown in FIG. 6(E). Therefore, output signal (HS) output from logic circuit 390 is always at logic value 0, and output signal (DFP) output from gate circuit 40 is always at logic value 1 as shown in FIG. 6(D).

According to the aforementioned operation, frequency dividing circuit 44 is not initialized, and frame synchronizing signal (IFP1) is formed at the time when the establishment of synchronization between frame pulse (SS) and frame synchronizing signal (IFP1) is detected.

The operation of phase comparator 36, judging circuit 38, and gate circuit 40 of frame synchronization detection circuit 3 will be explained with reference to FIG. 9 and FIG. 11 for the case when frame pulse (SS) and frame synchronizing signal (IFP1) are not synchronized.

As shown at times a, b, and c, in Figure 11(B), when frame pulse (SS) does not have logic value of 1 during the time frame synchronizing signal (IFP1) has a logic value of 1, namely, when the phase difference of frame synchronizing signal (IFP1) and frame pulse (SS) is greater than ±1 sample, output signal (PCS1) of logic circuit 360 in phase comparator 36 always has logic value 1. Therefore, count values (QA)–(QD) of counter circuit 380 are incremented every time first transition point of frame synchronizing signal (IFP1) is input as shown in Figure 11(C).

When count values (QA)–(QC) of counter circuit 380 are numerical value 1 to numerical value 7, one of count values (QA)–(QC) has a logic value of 1, so that output signal (ORS) of logic circuit 384 always has a logic value of 1 as shown in Figure 11(D). Therefore, logic value 1 is input into input terminal (CLR) of counter circuit 386, and counter circuit 386 is not initialized. Consequently, the count value of counter circuit 386 is incremented every time first transition point of frame synchronizing signal (IFP2) is input, as shown in FIG. 11(F).

On the other hand, frequency dividing circuit 44 is initialized every time frame pulse (SS) is at logic value 1, so that frame synchronizing signal (IFP2) formed by frequency dividing circuit 44 is always synchronized to frame pulse (SS), as shown in Figure 11(E).

When counter value of counter circuit 386 has a numerical value of 2, namely, when only count value (QB) of counter circuit 386 is logic value 1, count value (QB) in which the logic value was inverted by logic circuit 388 is input into input terminal (E) of counter circuit 386, and counter circuit 386 stops counting and holds the numerical value. Therefore, count value (QB) of counter circuit 386 remains as logic value 1, as shown in FIG. 11(G) and output signal (HS) also remains as logic value 1, as shown in FIG. 11(H).

When output signal (HS) is logic value 1, output signal (DFP) of gate circuit 40 goes to logic value 0 if frame pulse (SS) is logic value 1 at time c in FIG. 11(B), frequency dividing circuit 42 which was input with frame pulse (SS) of logic value 0 is initialized and forms frame synchronizing signal (IFP1) synchronized to frame pulse (SS) from the next frame |sic|, as shown in FIG. 11 (I).

When digital MUSE signal (ADS) does not include a significant frame pulse and frame pulse (SS) does not have logic value 1 continuously for 8 frames, count value (QD) of counter circuit 380 goes to logic value 1 and counter circuit 380 stops counting and holds the count value until frame synchronizing signal (IFP1) and frame pulse (SS) are logic value 1 simultaneously, as in counter circuit 920 of frame synchronization detection circuit 9 shown in the first embodiment.

On the other hand, when counter circuit 380 has stopped counting in this type of situation, count values (QA)–(QC) of counter circuit 380 all go to logic value 0, that so output signal (ORS) goes to logic value 0 and counter circuit 386 stops at the initialized state.

As noted above, in frame synchronization detection circuit 3 of the second embodiment, correct frame pulse (SS) and nonsynchronization cannot be detected unless the phase difference between inaccurate frame pulse (SS) and frame synchronizing signal (IFP1) exceeds a prescribed value continuously for 8 frames. Therefore, the inconvenience of a frame error being generated frequency does not easily occur, even when random noise is superimposed on the MUSE signals. Also, even when frame pulse is not detected continuously for 8 frames, nonsynchronization is detected.

On the other hand, when the MUSE signal is switched, frame synchronization detection circuit 3 differs from frame synchronization detection circuit 9 and can form frame synchronizing signal (IFP1) synchronized to a new MUSE signal after two frames from the time new MUSE signals have begun to be input.

Consequently, the picture on the screen is not disordered unnecessarily, even when the MUSE signal is switched by channel switching, etc.

Values such as time (8 frames) for detecting nonsynchronization in counter circuit 380, time (2 frames) for detecting the establishment of synchronization in counter circuit 386, and reference value (±1 sample) of the phase difference between frame pulse (SS) and frame synchronizing signal (IFP1), etc., are [nonlimiting] examples and can be used in accordance with the given conditions, etc., of MUSE decoder 1.

Also, the circuit configuration of frame synchronization detection circuit 3 is a [nonlimiting] example as are the signal waveform and logic values thereof. Also, each circuit in frame synchronization detection circuit 3 can be replaced with other circuits having the same function and performance or with processing according to software.

Also, that the phase difference is "less than a prescribed value" or "greater than a prescribed value" only means that the phase difference is discriminated into two states, and into what state to discriminate a given case when the phase difference is equal to a prescribed value is optional.

Also, frame synchronization detection circuit 3 can be used in the synchronization detection of other types of signals and the formation of synchronizing signals by suitably modifying pattern detection circuit 30, integrating circuit 32, and slicing circuit 34 and is not limited to MUSE signals.

In addition to the second embodiment, the synchronization detection circuit of the present invention can be variously constituted in the same way as the modified example shown here.

Embodiment 3

Below the third embodiment of the present invention will be explained with reference to FIG. 12.

Judging circuit 48 shown in the third embodiment is a circuit with improved judging circuit 38 of frame synchronization detection circuit 3 shown in the second embodiment, a different detection time for the establishment of synchronization and the timing for starting the process of the establishment of synchronization, and a replaced judging circuit 38 in MUSE decoder 1.

The constitution and operation of judging circuit 48 will be explained with reference to FIG. 12.

Figure 12:
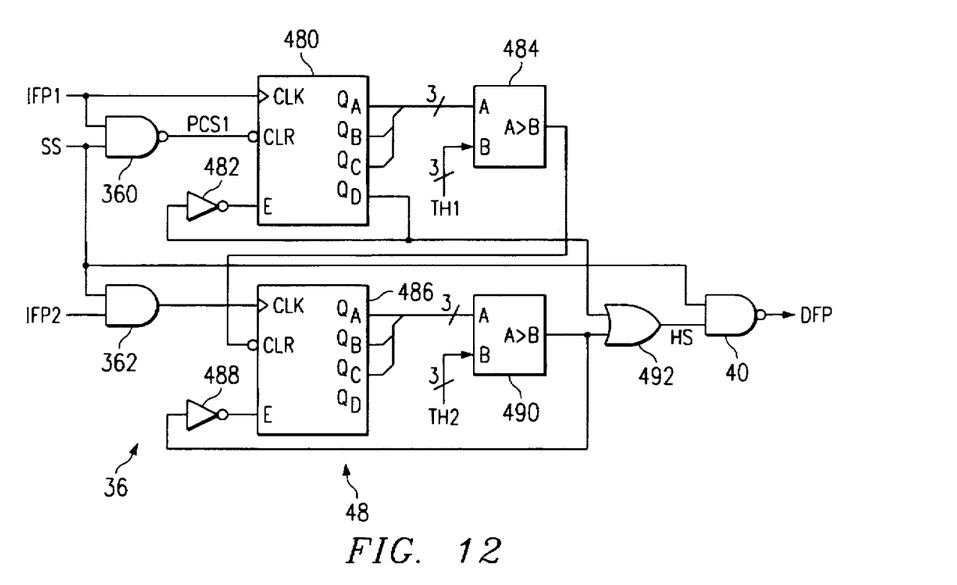
FIG. 12 shows the constitution of the judging circuit of the third embodiment.

FIG. 12 is a figure showing the constitution of judging circuit 48 in the third embodiment.

As shown in FIG. 12, judging circuit 48 comprises counter circuits 480 and 486, comparators 484 and 490, and logic circuits 482, 488, and 492.

Counter circuits 480 and 486 have the same function as counter circuit 920 of frame synchronization detection circuit 9,shown in the first embodiment, counter circuits 380 and 386 of frame synchronization detection circuit 3 of the second embodiment, and correspond respectively to counter circuits 380 and 386 of frame synchronization detection circuit 3.

Comparator 484 is a circuit which corresponds to logic circuit 384 of frame synchronization detection circuit 3 of the first embodiment. It compares the count value of count circuit 480 to threshold value (Th1), and outputs logic value 1 when it is greater.

Comparator 490 compares count value of count circuit 486 to threshold value (Th2), and outputs logic value 1 when the count exceeds the threshold value.

Logic circuits 482, 488, and 492 respectively execute the operation corresponding to logic circuits 382, 388, and 390 of frame synchronization detection circuit 3 of the second embodiment.

Threshold value (Th1) set in comparator 484 is a value which sets the time for starting the counting of counter circuit 486 when the phase difference between frame pulse (SS) and frame synchronizing signal (IFP1) is greater than the prescribed value, and is set by the user of, for example, MUSE decoder 1 by using, for example, a dip switch (not shown in the figures).

Also, threshold value (Th2) set in comparator 490 is a value which sets the time for detecting the establishment of synchronization of the signal when the phase difference of frame pulse (SS) and frame synchronizing signal (IFP2) becomes less than the prescribed value, and is set by the user of, for example, MUSE encoder 1 by using, for example, a dip switch (not shown in the figures), like threshold value (Th1).

Except for the possibility of optional setting of threshold values (Th1) and (Th2) in comparators 484 and 490, the operation of judging circuit 48 is the same as in frame synchronization detection circuit 3 of the second embodiment.

By constituting judging circuit 48 as explained above and replacing judging circuit 38 in frame synchronization detection circuit 3, it is possible to make the operation of frame synchronization detection circuit 3 flexible, and to broaden the application of frame synchronization detection circuit 3.

As noted above, according to the synchronization detection circuit of the present invention detection of resynchronization to the new input signals when the input signals are changed due to channel switching, etc., can be performed.

Also, according to the present invention, unnecessary detection of nonsynchronization does not frequently occur, even if random noise is superimposed on the input signals, even with the ability to detect resynchronization quickly.

I claim:

1. A synchronization detection circuit which contains a synchronization pattern formation means which forms a synchronization pattern by detecting the signal pattern contained in the input signal at a prescribed cycle, a first synchronizing signal formation means which forms the first synchronizing signal of the cycle as the synchronization pattern, a second synchronizing signal formation means which forms a second synchronizing signal of same cycle as the synchronization pattern by being initialized by the synchronization pattern, a first phase difference detection means which detects the first phase difference between the synchronization pattern and the first synchronizing signal, a second phase difference detection means which detects the second phase difference between the synchronization pattern and the second synchronizing signal, a nonsynchronization judging means which detects a state in which the cycle at which the first phase difference becomes greater than the processing value continuously by more than a first numerical value or a state in which in addition to the first phase difference becoming greater than the prescribed value, the cycle at which the second phase difference becomes less than the prescribed value continuously by more than a second numerical value, which is smaller than the first numerical value, as the measure of nonsynchronization, and an initializing means which initializes the first synchronizing signal formation means according to the synchronization pattern when the nonsynchronization judging means detects nonsynchronization and matches the phase of the synchronizing signal to the phase of the synchronization pattern.

2. The synchronization detection circuit of claim 1 which supplies the first synchronizing signal as the internal synchronizing signal.

\* \* \* \* \*